United States Patent [19]

Schultz et al.

[11] Patent Number: 4,516,592
[45] Date of Patent: May 14, 1985

[54] MILKER UNIT WASHER

[75] Inventors: Per-Erik Schultz, Aelvsjoe, Sweden; Mofazzal H. Chowdhury, Kansas City, Mo.; Clayton B. Neff, Shawnee, Kans.

[73] Assignee: Alfa-Laval, Inc., Tumba, Sweden

[21] Appl. No.: 584,893

[22] Filed: Feb. 29, 1984

[51] Int. Cl.³ .......................... A01J 5/00; B08B 3/04; B08B 9/00
[52] U.S. Cl. .............. 134/169 C; 119/14.18; 134/171
[58] Field of Search ................ 134/43, 44, 53, 54, 134/56 R, 59, 60, 137, 143, 144, 145, 151, 152, 134/157, 162, 169 R, 169 C, 166 R, 166 C, 167 R, 134/167 C, 171, 172, 177, 178, 198, 199, 200; 119/14.18

[56] References Cited

U.S. PATENT DOCUMENTS

| | | | |
|---|---|---|---|
| 3,012,566 | 12/1961 | Baker | 134/171 X |
| 3,040,755 | 6/1962 | Sigmon et al. | 134/169 C |
| 3,629,005 | 12/1971 | Belden | 134/171 |
| 3,834,407 | 9/1974 | Heitman | 134/56 R |
| 3,958,584 | 5/1976 | Jones | 134/56 R |

Primary Examiner—Philip R. Coe
Assistant Examiner—Stuart J. Maltzman
Attorney, Agent, or Firm—Cyrus S. Hapgood

[57] ABSTRACT

For washing a milker unit, the teat cups are inserted in respective flexible receivers which seal around the enlarged end portions of the teat cups and communicate with a distributor having an inlet connected to a vacuum line for washing liquid. During washing, a high vacuum in the milk pipe line raises a valve in the distributor, while closing a drain opening therefrom, and draws washing liquid through the distributor, the receivers, the teat cups therein, the milk claw connected to the teat cups, and then into the milk pipe line for washing the latter. After washing, atmospheric pressure prevailing in the milker unit and distributor allows the valve to drop to a position where excess washing liquid can drain through said opening. For milking, the teat cups are applied to the cow after removing them from the receivers, which are then stored by simply pushing them upwardly onto respective holders where they are automatically closed against entrance of dirt. During milking, the vacuum in the washing liquid line holds the valve against a seat to close the distributor inlet and prevent atmospheric air from entering the vacuum system. To remove the stored washing unit for a washing operation, the receivers are simply pulled down to release them from their holders.

12 Claims, 3 Drawing Figures

MILKER UNIT WASHER

This invention relates to devices for washing milking systems and more particularly to a novel device for washing the milk claws and teat cup assemblies of such systems.

BACKGROUND

In modern milking systems, a milker unit is provided for each stall where a cow is to be milked, each milker unit comprising a milk claw and a set of teat cups through which milk is delivered to the claw under vacuum from the cows teats. From the claws of the respective units, the milk flows under vacuum to a common destination such as a pipe line leading to a cooling and storage tank.

It is important to clean the milking system promptly after each use. Otherwise, consistent production of high quality milk with low bacteria counts cannot be assured.

In order to eliminate the necessity of disconnecting the milker units from their common vacuum source and carrying them from the stalls to a cleaning site, various so-called clean-in-place (CIP) systems have been devised. These systems, of course, require means for supplying a washing solution to the teat cups of the milker units at the stalls. To function properly, each unit washer also requires a drain and a valve to shut off vacuum to the unit washer during milking.

These requirements were met by an arrangement disclosed in part in Heitman U.S. Pat. No. 3,834,407 granted Sept. 10, 1974. In that arrangement, each milking stall is provided with a manifold which is connected through a tube to the usual vacuum/wash pipe line of the milking system to receive the washing solution. Each manifold has four nipples onto which the teat cups are pushed and held to supply the solution to the milker unit, the solution then being drawn from the milk claw under vacuum. The drain is located at the bottom of the manifold, and a manually operated pinch valve is provided on the solution supply tube to shut off the vacuum to the manifold during milking. A cover is held in a raised position during cleaning and can be lowered to cover the manifold nipples during milking.

One problem with this prior arrangement is that only the inside of the teat cup liners is cleaned. That is, since the washing solution is supplied through the nipple which is pushed inside the liner, the solution cannot reach any other surface. Another problem is deformation of the liner's mouth by the nipple which at least partly supports the teat cups. Moreover, the cover requires separate manual operations to move it between its raised and covering positions.

The above-noted prior arrangement has been improved by use of so-called jetter-cups in lieu of the manifold. A jetter-cup is a rubber cup into which the enlarged end portion of a teat cup is received rather than this end portion receiving a manifold nipple. This avoids deformation of the liner's mouth piece and allows circulation of cleaning solution around the outside of the liner for complete cleaning of its head. Moreover, the jetter-cups during milking can be hung out of the way on a storage unit which can also be used as a milker unit hanger, eliminating the need for another bracket.

However, the typical jetter-cup storage unit is difficult to use and easily damaged. Storage is accomplished by sliding each jetter-cup under a protective hood between a pair of wires. To adequately insure cleanliness, the fit between the hood and the wires must be quite tight, which causes binding when the jetter-cups are slid into place. This often leads to improper storing of the jetter-cups, thus defeating the purpose of the protective hood. Further, jetter-cup systems usually include a drain, distributor, hanger and vacuum shut-off valve in addition to the jettercups, these parts being interconnected by several milk tubes for proper operation. Also, these prior systems still require the operator to remember to open and close the vacuum shut-off valve of each unit before and after each milking.

The principal object of the present invention is to provide a milker unit washing device which avoids the abovenoted problems with prior washing devices.

SUMMARY OF INVENTION

A milker unit washing device made according to the present invention comprises four flexible cup-shaped receivers (i.e., jetter-cups) adapted to receive the enlarged end portions of the respective teat cups. As is conventional, each teat cup has an elongated shell and a flexible liner (inflation) extending lengthwise through the shell, an enlarged head of the liner protruding from one end of the shell and having a depending annular wall closely surrounding the shell. The head also has a mouth piece with an opening for receiving a teat. Each jetter-cup receiver has a flexible annular flange defining an opening through which the enlarged end portion of a teat cup can enter its jetter-cup, whereupon the annular flange surrounds and seals against the teat cup's shell adjacent the annular wall of the liner. The jetter-cups communicate with the chamber of a distributor having a valve seat and a washing liquid inlet leading to the chamber through the valve seat.

During milking, a valve in the distributor chamber is held against the seat by a vacuum in the liquid inlet, thereby closing the inlet. During cleaning, a vacuum applied to the milker unit unseats the valve and draws washing liquid into the distributor chamber from its inlet and thence through the four jetter-cups, the respective teat cups and the milk claw. Preferably, the distributor also has a bottom opening which is automatically closed by the valve during cleaning; but when atmospheric pressure prevails in both the washing liquid inlet and the milker unit, the valve allows washing liquid to drain through the bottom opening.

During milking, the jetter-cups are stored on four holders depending from a bracket and having members for releasably hanging the jetter-cups and distributor from the bracket.

In the preferred construction, each jetter-cup holder includes a generally annular member and a rod on which this annular member depends from the bracket. Each annular member is adapted to be inserted into a jetter-cup through its opening by flexing of the annular flange surrounding the opening; and when thus inserted, the outer part of the annular member underlies and supports the annular flange of the jettercup. A cover on each rod is engageable with the annular flange of a jetter-cup hanging from the holder to close the opening of the jetter-cup.

According to the present invention, the jetter-cups and distributor constitute a compact structure for washing a milker unit and in which the distributor serves three functions. It splits the washing liquid from its inlet to the four outlets to the jetter-cups, its valve automatically cuts off vacuum to the washer during milking, and its bottom opening under control of the valve allows drainage of washing liquid upon completion of the cleaning. During cleaning, the claw of the milker unit can be hung on the bracket which supports the jetter-cups. The latter can be easily pulled from their respective holders to prepare for cleaning, and when they are pushed back upon the holders the openings of the jetter-cups are automatically closed by the covers to facilitate sanitation.

THE DRAWINGS

A preferred embodiment of the invention will now be described with reference to the accompanying drawings in which FIG. 1 is an elevational view, partly in section, of the washing device when stored during milking;

FIG. 2 is a schematic view of a milker unit about to be hung on the bracket for supporting the washing device after its removal in preparation for cleaning; and FIG. 3 is a vertical sectional view of one of the jetter-cups applied to a teat cup for cleaning.

DETAILED DESCRIPTION

Figure 1:
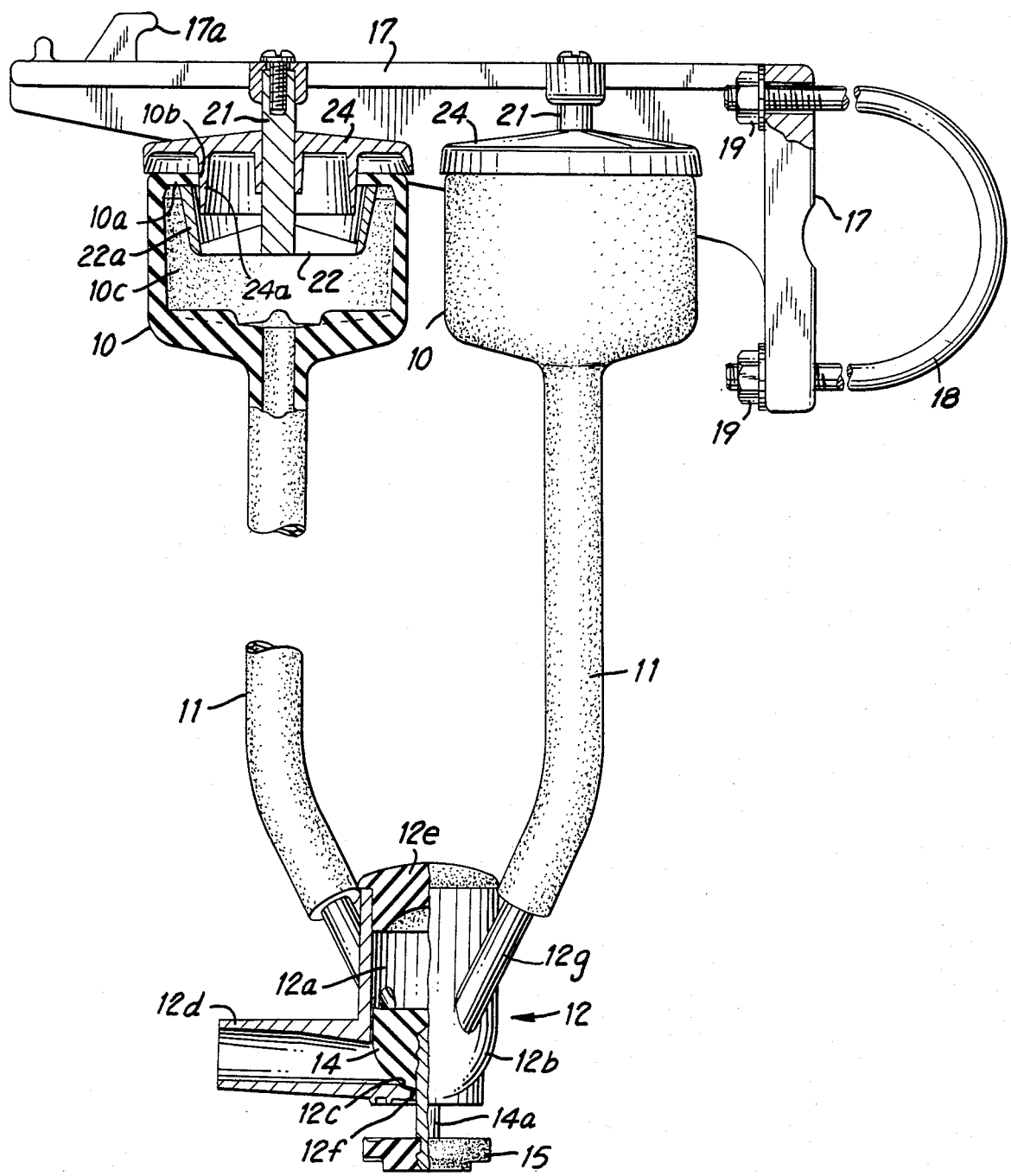

The new washing device comprises four jetter-cups 10 forming teat-cup receivers, only two of them being shown in FIG. 1. Each jetter-cup is made of rubber and has at its upper end a flexible annular flange 10a defining a central opening 10b leading into the receiving space 10c. The four spaces 10c communicate with respective flexible tubes 11 depending from the jetter-cups and leading into a chamber 12a in a distributor shown generally at 12. The distributor includes a hollow body 12b forming at its lower portion a valve seat 12c and having a washing liquid inlet 12d leading through the seat into chamber 12a. The latter is closed at the top by a removable plug 12e and is provided at the bottom with a drain opening 12f. Tubes 11 may be connected to the distributor through conventional nipples 12g.

A valve 14 shaped as a hemi-sphere normally rests on seat 12c and has a stem 14a extending loosely through opening 12f and projecting downward from the distributor body 12b. A seal 15 is secured to the lower end of stem 14a.

During milking, the parts 10–15 are stored on a bracket 17 mounted at any convenient location on the corresponding milking stall (not shown). For this purpose, a U-bolt 18 may be used to mount the bracket on a horizontal or vertical pipe of the stall, the two legs of the bolt extending through holes in the bracket and being secured by nuts 19.

Four rods 21 depend from bracket 17 to which they are releasably secured in any suitable manner. Each rod carries at its lower end a member 22 having an upwardly and outwardly flaring annular wall 22a, the top of the latter having an outer diameter substantially greater than the diameter of jetter-cup opening 10b. The parts 21–22 constitute a holder for a corresponding jetter-cup 10. Each rod 21 extends through a cover 24 slidable vertically on the rod and overlying the annular wall 22a.

To apply a jetter-cup to a holder 21–22, the jetter-cup is simply pushed upward starting with the bottom of member 22 centrally engaging the top of the jetter-cup. As the latter moves upward, member 22 enters the cup through its opening 10b and deflects the surrounding flange 10a downward until its annular inner edge snaps over the top of annular wall 22a. When released, the jetter-cup is now fully supported because its flange 10a rests upon the top of the underlying annular wall 22a. Cover 24 is raised by the jetter-cup as flange 10a is pushed upward around annular wall 22a. However, when flange 10a snaps back to its horizontal position over wall 22a and the jetter-cup is released, the cover descends to a position in which its depending annular flange 24a centers the jetter-cup within the cover's depending outer rim which encircles the outside of the jetter-cup, thereby sealing against dirt infiltration. Thus, the jetter-cups are automatically closed against the entrance of dirt while stored during milking.

Figure 2:
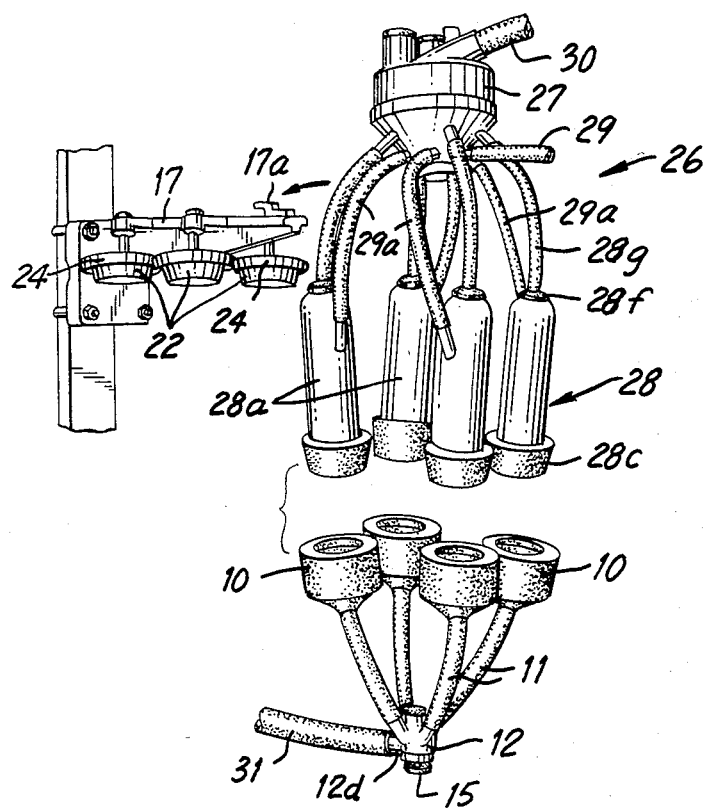

The jetter-cups 10 are released for the washing operation by simply pulling them down from their holders 21–22, each flange 10a flexing upward until it clears the annular wall 22a. Cover 24 then descends until supported by the upper end of wall 22a. However, before releasing the jetter-cups, milker unit 26 is removed from its milking position and transferred to where it can be hung on bracket 17, as shown in FIG. 2. As there shown, the unit has a conventional claw 27 and a set of teat cups 28 connected thereto. The claw is provided with suitable means such as a bail (not shown) by which it is suspended from a fitting 17a at the end of bracket 17, so that the teat cups hang from the claw.

Each teat cup comprises an elongated metal shell 28a and a rubber liner 28b extending lengthwise through the shell. The liner has an enlarged head protruding from one end of the shell and including a depending annular wall 28c closely surrounding the shell. The liner head also includes a mouthpiece 28d forming an opening 28e for receiving a teat. The liner is held taut in the shell by a bead 28f engaging the opposite end of the shell and has a tube 28g through which the interior of the liner communicates with the interior of claw 27. Pneumatic pulsations from a suitable pulsator (not shown) are transmitted through tube 29, part of the claw and tubes 29a into the pulsation chambers 29b of the respective teat cups. Milk from the latter passes through tubes 28g, claw 27 and milk hose 30 to the desired destination.

The above-described milker unit and its operation are conventional, as will be understood by those skilled in the art.

Figure 3:
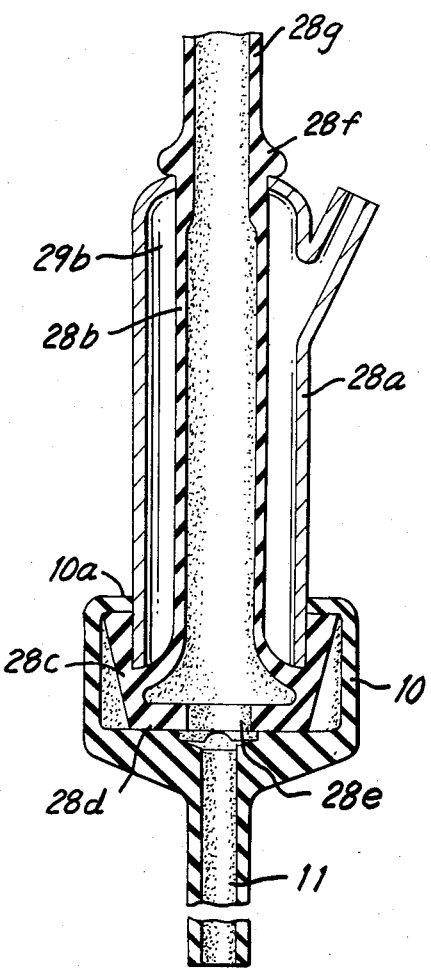

To wash the milker unit, the enlarged lower end of each hanging teat cup is inserted in a corresponding jettercup 10. This is easily accomplished because the flange 10a and walls of the jetter-cup readily flex to accommodate the insertion. As shown in FIG. 3, the inner edge of flange 10a now engages and seals against the outer surface of shell 28a around its entire circumference, the flange also engaging the end of wall 28c.

Distributor inlet 12d is connected through hose 31 to the usual washing liquid supply line (not shown) which is maintained under vacuum during milking as well as washing. During milking, however, the vacuum is shut off from distributor 12 because it holds valve 14 against seat 12c so as to close inlet 12d. After milking, milk hose 30 of the milker unit remains connected to the usual milk pipe line which will now be at atmospheric pressure. For washing, the high vacuum is resumed in the milk pipe line and acts through hose 30 to overcome the vacuum in hose 31 so that valve 14 is sucked upwardly toward plug 12e, whereby washing liquid is drawn from distributor inlet 12d through chamber 12a, tubes 11, teat cups 28, milk claw 27 and hose 30 into the milk pipe line so as to clean the milking system in the usual fashion. During this washing cycle, seal 15 is held against the bottom of distributor 12 so as to close valve opening 12f around valve stem 14a. Thus, atmospheric air is prevented from impairing the washing operation.

Upon completion of washing, atmospheric pressure is allowed to enter the entire system, whereby valve 14 drops to the bottom of distributor chamber 12a where it rests in a position in which both inlet 12d and drain opening 12f are open. Thus, the milk claw 27, teat cups 28, jetter-cups 10, distributor 12 and washing liquid hose 31 can be completely drained of the washing liquid. Unlike during milking, there is no vacuum on wash line 31 after milking, so that valve 14 does not seal against seat 12c to close inlet 12d. This allows excess water in hose 31 to drain through the distributor. Since the drain is at the bottom of the distributor, it is easy to insure that it is at the lowest part of the system so as to assure complete drainage.

From the foregoing, it will be apparent that there is no possibility of an operator-caused vacuum leak in the system, since valve 14 is immediately sucked against seat 12c to close inlet 12d when milking is started. Once the washer unit is placed on the milker unit, no other significant operation is necessary, thus reducing the risk of a milking unit not being properly washed. The cleaning system is automatically drained upon completion of cleaning. The distributor, drain and vacuum shut-off valve are combined in a compact unit which can be easily stored with the jetter-cups to keep them clean during milking.

We claim:

1. In combination with a vacuum milker unit including a milk claw and a set of teat cups communicating with said claw for delivering milk thereto under vacuum from the teats of a cow, each teat cup having an elongated shell and a flexible liner extending lengthwise through the shell, said liner being provided with an enlarged head protruding from an end portion of the shell and having a depending annular wall closely surrounding said end portion, said head also having a mouth piece with an opening for receiving a said teat, a device for washing said milker unit and comprising a plurality of flexible cup-shaped receivers adapted to receive said liner heads of the respective teat cups, each receiver having a flexible annular flange defining an opening into the receiver, said flange being adapted to surround and seal against the teat cup's shell adjacent said annular wall, a distributor depending from said receivers and having a chamber communicating with each of said receivers, the distributor also having a valve seat and a washing liquid inlet to the chamber through said seat, a plurality of holders for the respective receivers, a bracket on which said holders are mounted, said holders being operable to releasably hang said receivers and distributor from the bracket, and a valve element in said chamber operable by a vacuum in said inlet to close said inlet by engaging said seat and movable by a vacuum in said receivers to disengage said seat and open said inlet.

2. The combination of claim 1, comprising also a cover mounted on each said holder and operable to close said opening of a receiver hanging from the holder.

3. The combination of claim 1, in which the distributor also has a drain opening leading from said chamber, the combination comprising also a stem on the valve element extending loosely through said drain opening, and a seal secured to the stem outside the distributor and operable to seal the drain opening in response to movement of the valve element to open said inlet.

4. The combination of claim 3, in which said valve element includes a surface sealing said drain opening while the valve element is held against said seat by vacuum in said inlet, the valve element being movable to unseal the drain opening while atmospheric pressure prevails in said inlet and receivers.

5. The combination of claim 1, in which each holder includes a generally annular member and a rod on which said annular member depends from said bracket, each said annular member being dimensioned for insertion into a said receiver through said opening thereof by flexing of said flange, each annular member having a part of greater diameter than said receiver opening and on which said receiver flange can rest to support the receiver, each receiver being removable from a said holder by flexing of the receiver's said flange when the receiver is pulled from said annular member.

6. The combination of claim 5, comprising also a cover mounted on each said rod and operable to close said opening of a receiver hanging from the corresponding holder.

7. The combination of claim 5, comprising also a cover slidably mounted on each said rod and movable thereon to a position for closing said opening of a receiver hanging from the corresponding holder, said cover being raisable from said position by said receiver to accommodate said insertion of said annular member into said receiver.

8. The combination of claim 1, in which said distributor has a top opening and a removable plug for closing said top opening.

9. The combination of claim 1, in which said bracket has a portion for suspending said milk claw of the milker unit.

10. In a washing device for a milker unit, the combination of four teat cup receivers each having a receiving space and a flexible annular flange defining an opening dimensioned for entrance of a teat cup into said space, a distributor forming a chamber and having a valve seat and a washing liquid inlet leading to the chamber through said seat, tubes through which the respective receivers communicate with said chamber and from which said distributor is suspended, a valve element in said chamber operable by a vacuum in said inlet to close said inlet by engaging said seat, said valve element being movable in response to a vacuum in said receiver spaces to disengage said seat and open said inlet, a plurality of holders for the respective receivers and a bracket on which said holders are mounted, each holder including a generally annular member and a rod on which said annular member depends from the bracket, each annular member having a part of greater diameter than said receiver opening and engageable with said receiver flange from within said space to support the receiver, said annular member being dimensioned for insertion through said receiver opening by flexing of said receiver flange.

11. The combination of claim 10, comprising also a cover mounted on each said rod and engageable with said flange of a receiver hanging from the corresponding holder to close the receiver opening.

12. The combination of claim 10, in which the distributor also has a drain opening leading from the lower part of said chamber, the combination comprising also a stem on the valve element extending loosely through the drain opening, and a seal secured to the stem outside the distributor and operable to seal the drain opening in response to movement of the valve element to open said inlet.

* * * * *